*Leasure & Gill,*
*Cooling Glass Presses.*
Nº 60,203. Patented Dec. 4, 1866.
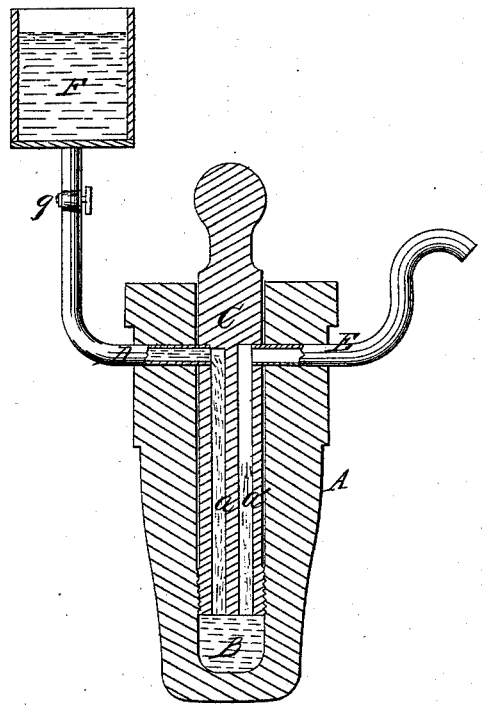

United States Patent Office.

IMPROVED COOLING GLASS-PRESS.

HENRY I. LEASURE AND JAMES S. GILL, OF WHEELING, WEST VIRGINIA.

Letters Patent No. 60,203, dated December 4, 1866.

SPECIFICATION.

TO ALL WHOM IT MAY CONCERN:

Be it known that we, HENRY I. LEASURE and JAMES S. GILL, of Wheeling, in the county of Ohio, and State of West Virginia, have invented a new and useful improvement in Cooling-Glass Press Plungers; and we do hereby declare that the following is a full, clear, and exact description thereof, which will enable others skilled in the art to make and use the same, reference being had to the accompanying drawing, forming part of this specification.

The object of our invention is to obviate a difficulty which has always been met with by manufacturers of pressed glass-ware, and that is, the heating of the plunger during the process of moulding and pressing the molten glass into shape to such a degree as to cause much delay, and our invention consists in so forming the plunger that a constant stream of water or other liquid or air may be made to pass into and be discharged from the plunger when it is in use, whereby it may be kept cool. The drawing represents a vertical section of a plunger for pressing tumblers and other similar articles.

A is the plunger, constructed hollow; the hollow portion extends from the top to near the bottom. B represents this hollow portion at its lower end. C is a plug fitted into the hollow space B, and extending down to near the bottom of it, as seen in the drawing. In this plug are holes, $a$ $a'$. These holes extend from the lower end to near the top of the plug, where they communicate with pipes, D and E. Connected with the pipe D there is a reservoir, F, which contains water or other liquid, when liquid is used for cooling. In the pipe D there is a cock, $g$, to let on or stop off the water, or air, if air be used for cooling. The plunger is connected with the piston-rod of the press in the usual manner. The pipe E is a discharge-pipe for the water or air. The pipe D may be connected with bellows, as before intimated, and a current of cold air to be forced through the plunger for the purpose of cooling it. When water or other liquid is used, the discharge-pipe E may be connected with the vessel or reservoir F, but as steam would be generated in the plunger, we think it better to discharge the steam and water, as indicated in the drawing. By turning the cock $g$ a constant stream of water may be made to circulate through the plunger, carrying off a large portion of the heat. We do not confine ourselves to this particular method of cooling the plungers of glass-presses with water or air. We are aware that it may be done in other ways than that which we have described. Holes may be bored into the plunger at an angle, and connect together near the bottom with pipes attached, as already described. Or the piston-rod may be a hollow tube connected with apertures in the plunger, for the admission and discharge of either water or air, and there may be other modifications.

But having thus described our invention, what we claim as new, and desire to secure by Letters Patent, is—

Cooling the plunger of a glass-press with water or other liquid, or atmospheric air, substantially as herein shown and described.

HENRY I. LEASURE,
JAMES S. GILL.

Witnesses:
JESSE S. WHEAT,
BENEDICK SPEIDEL.